(12) United States Patent
Fischer et al.

(10) Patent No.: US 12,716,509 B2
(45) Date of Patent: Aug. 25, 2026

(54) CHECK VALVE AND USE THEREOF IN A FLUID SYSTEM

(71) Applicant: Vitesco Technologies GmbH, Regensburg (DE)

(72) Inventors: Matthias Fischer, Ringgau (DE); Wolf Goetze, Rotenburg (DE)

(73) Assignee: Vitesco Technologies GmbH, Regensburg (DE)

( * ) Notice: Subject to any disclaimer, the term of this patent is extended or adjusted under 35 U.S.C. 154(b) by 65 days.

(21) Appl. No.: 18/740,918

(22) Filed: Jun. 12, 2024

(65) Prior Publication Data

US 2024/0328524 A1 Oct. 3, 2024

Related U.S. Application Data

(63) Continuation of application No. PCT/EP2022/085627, filed on Dec. 13, 2022.

(30) Foreign Application Priority Data

Dec. 17, 2021 (DE) ..................... 10 2021 214 640.6

(51) Int. Cl.
*F16K 15/06* (2006.01)
*F16K 17/196* (2006.01)
*F16K 27/02* (2006.01)

(52) U.S. Cl.
CPC ........ *F16K 15/063* (2013.01); *F16K 27/0209* (2013.01); *F16K 17/196* (2013.01); *Y10T 137/7777* (2015.04)

(58) Field of Classification Search
CPC . E03B 7/10; F16K 17/18; F16K 17/19; F16K 17/196; Y10T 137/1189; Y10T 137/7777; Y10T 137/778
See application file for complete search history.

(56) References Cited

U.S. PATENT DOCUMENTS 3,625,248 A * 12/1971 Lhotellier ............... F16K 17/18 137/493.6
3,809,117 A * 5/1974 Oota ..................... F16K 17/044 137/493.6

(Continued)

FOREIGN PATENT DOCUMENTS

CN 110005847 A 7/2019
DE 202020105036 U1 12/2021

(Continued)

OTHER PUBLICATIONS

European Search Report dated Mar. 6, 2023 for corresponding European Patent Application No. PCT/EP2022/085627.

(Continued)

*Primary Examiner* — Robert K Arundale

(57) ABSTRACT

A check valve includes: a housing having a main body, which has an inlet opening, a valve body, which has a passage having an outlet opening and which is at least partly arranged in the main body and is axially movable relative to the main body, a valve element, which is at least partly arranged in the valve body for axial movement relative to the valve body and which has a through-opening, a valve member, which is arranged in the valve body between the outlet opening and the valve element and has a sealing element and a valve stem, which is axially movable relative to the valve body, a preloading element, which is designed to preload the valve member toward the valve element with a preload force, wherein the check valve also includes: a further preloading element, which is designed to preload the valve element toward the valve member with a preload force of the further preloading element, and/or another preloading element, which is designed to preload the valve body toward the inlet opening with a preload force of the other preloading element, wherein the valve element includes a sealing seat, which surrounds the through-opening and faces the sealing (Continued)

element, and in a closed position of the check valve the sealing element abuts the sealing seat and closes the through-opening.

9 Claims, 4 Drawing Sheets

(56) References Cited

U.S. PATENT DOCUMENTS

| | | | | |
|---|---|---|---|---|
| 3,905,382 | A | 9/1975 | Waterston | |
| 2003/0150492 | A1* | 8/2003 | Sato | F16K 17/196 137/493.6 |
| 2005/0028869 | A1* | 2/2005 | Roth | F16K 17/196 137/493.4 |
| 2021/0310223 | A1 | 10/2021 | Ball | |
| 2023/0341072 | A1* | 10/2023 | Soder | F16L 55/05 |
| 2024/0400005 | A1* | 12/2024 | Goetze | F16K 37/0041 |

FOREIGN PATENT DOCUMENTS

| | | | |
|---|---|---|---|
| JP | S63225773 | A | 9/1988 |
| JP | 2004157117 | A | 6/2004 |

OTHER PUBLICATIONS

National Search Report dated Oct. 18, 2022 for corresponding German Patent Application No. 10 2021 214 640.6.

* cited by examiner

CHECK VALVE AND USE THEREOF IN A FLUID SYSTEM

CROSS-REFERENCE TO RELATED APPLICATIONS

This application claims priority to PCT Application PCT/EP2022/085627, filed Dec. 13, 2022, which claims priority to German Patent Application No. DE 10 2021 214 640.6, filed Dec. 17, 2021. The disclosures of the above applications are incorporated herein by reference.

FIELD OF THE INVENTION

The present invention relates to a check valve, which is provided for use in a fluid system, and to the use of the check valve in the fluid system, such as in a fluid system of a motor vehicle.

BACKGROUND OF THE INVENTION

Check valves known from the prior art generally have a preloading element, for example in the form of a restoring spring, the preloading element being designed such that, when a specified inlet pressure present at an inlet opening of the check valve is not reached, the preloading element presses a valve member having a sealing element with such a force toward a sealing seat of a valve element that the sealing element abuts the sealing seat with the check valve in a closed position and closes a through-opening of the valve element. When the specified inlet pressure is exceeded, the inlet pressure being produced, for example, by a pump, the check element is brought into an open position since the force of the inlet pressure moves the valve member in the direction away from the sealing seat against the force produced by the preloading element, and as a result the through-opening is opened.

SUMMARY OF THE INVENTION

It is an object of an embodiment of the present invention to provide an improved check valve.

According to one embodiment of the present invention, a check valve includes:

- a housing having a main body, which has an inlet opening,
- a valve body, which has a passage having an outlet opening, wherein the valve body is at least partly arranged in the main body and is axially movable relative to the main body,
- a valve element, which is at least partly arranged in the valve body and is axially movable relative to the valve body and which has a through-opening,
- a valve member, which is arranged in the valve body between the outlet opening and the valve element and has a sealing element and a valve stem, which is axially movable relative to the valve body,
- a preloading element, which is designed to preload the valve member toward the valve element with a preload force, wherein the check valve also includes:
- a further preloading element, which is designed to preload the valve element toward the valve member with a preload force of the further preloading element, and/or
- another preloading element, which is designed to preload the valve body toward the inlet opening with a preload force of the other preloading element, wherein
- the valve element includes a sealing seat, which surrounds the through-opening and faces the sealing element, and in a closed position of the check valve the sealing element abuts the sealing seat and closes the through-opening.

The preloading element and/or the further preloading element and/or the other preloading element is in the form of, for example, a respective restoring spring, such as a restoring coil spring. The preload force and the preload force of the further preloading element or the preload force and the preload force of the other preloading element or the preload force and the preload force of the further preloading element and the preload force of the other preloading element may be coordinated with one another such that, in a stationary closed position of the check valve, when an inlet pressure of a fluid at the inlet opening lies below a specified inlet pressure, the fluid being fed, for example, from a fluid reservoir to the inlet opening via a feed line to the inlet opening by a pump and belonging to a fluid system in which the check valve is used, the sealing element abuts the sealing seat and closes the through-opening. The preload force of the further preloading element and/or the preload force of the other preloading element are selected such that they are greater, and in an embodiment are considerably greater, than the preload force.

As a result, in an embodiment in which the check valve contains the further preloading element, in the case of freezing of a fluid contained in an outlet line connected to the outlet opening the expansion of the fluid caused by the freezing may be compensated by virtue of the compressing of the further preloading element in the direction of the inlet opening against the preload force of the further preloading element by the contact with the valve element, which is moved in the direction of the inlet opening by the freezing. Thus, damage to the check valve in the event of freezing is prevented.

Also as a result, in an embodiment in which the check valve contains the other preloading element, in the case of freezing and corresponding expansion of a fluid contained in the fluid reservoir and/or in a corresponding feed line to the inlet opening of the check valve the expanding frozen/freezing fluid may press the valve element and the valve member together with the valve body—for example, in the case that the axial movement of the valve stem relative to the valve body in the direction of the outlet opening is restricted by a corresponding holding device—in the direction of the outlet opening against the preload force of the other preloading element which is applied by the other preloading element, wherein the sealing element is moved, together with the valve disk and the valve stem, likewise in the direction of the outlet opening by the contact of the sealing seat with the sealing element. Thus, likewise damage to the check valve in the event of freezing is prevented.

After the fluid has thawed again, the check valve may return to its original position.

According to one embodiment, the valve body is radially sealed to the main body and/or the valve element is radially sealed to the valve body.

As a result, in one embodiment the fluid is prevented from flowing toward the outlet opening if the inlet pressure is less than the specified inlet pressure.

According to one embodiment, the housing has a retaining cap, such as a pot-like retaining cap, which has a bottom with an opening.

According to one embodiment, the other preloading element has a first end, which is supported on a region of the bottom of the retaining cap surrounding the opening, and a second end, which is supported on an axial front face of the valve body, or a radially outwardly protruding portion of the valve body; and/or the retaining cap has a wall, which radially surrounds a portion of the main body and/or is fastened thereto; and/or a portion of the valve body extends through the opening.

According to one embodiment, the main body includes a portion, such as a pot-like portion, having a main body bottom, in which the inlet opening is provided, and/or having a wall portion, which radially surrounds a further portion of the valve body.

According to one embodiment, the further preloading element has a first end, which is supported on a region of the main body bottom surrounding the inlet opening, and a second end, which is supported on a region of the valve element surrounding the through-opening of the valve element and facing the main body bottom.

According to one embodiment, the preloading element has a first end, which is supported on a valve disk of the valve member, and a second end, which is supported on a radially inwardly extending portion of an inner wall of the valve body.

According to one embodiment, the valve element is at least partly received in a receiving space of the valve body.

According to one embodiment, an inner wall of the receiving space has a radially inwardly extending portion, which is designed to limit the axial movement of the valve element toward the outlet opening relative to the valve body.

As a result, in one embodiment a further contribution is made to preventing damage to the check valve.

According to one embodiment, the check valve is designed such that, during normal use, with the check valve in an open position a fluid flows sequentially through the inlet opening, the through-opening, the passage and the outlet opening.

According to one embodiment of the invention, an above-described check valve is used in a fluid system of a motor vehicle.

The check valve may be used in a fluid system for cleaning a sensor by a fluid.

BRIEF DESCRIPTION OF THE DRAWINGS

Further advantages and features can be found in the exemplary embodiments. In this respect the drawings show, partially schematically.

DETAILED DESCRIPTION OF THE PREFERRED EMBODIMENTS

The following description of the preferred embodiment(s) is merely exemplary in nature and is in no way intended to limit the invention, its application, or uses.

Figure 1:
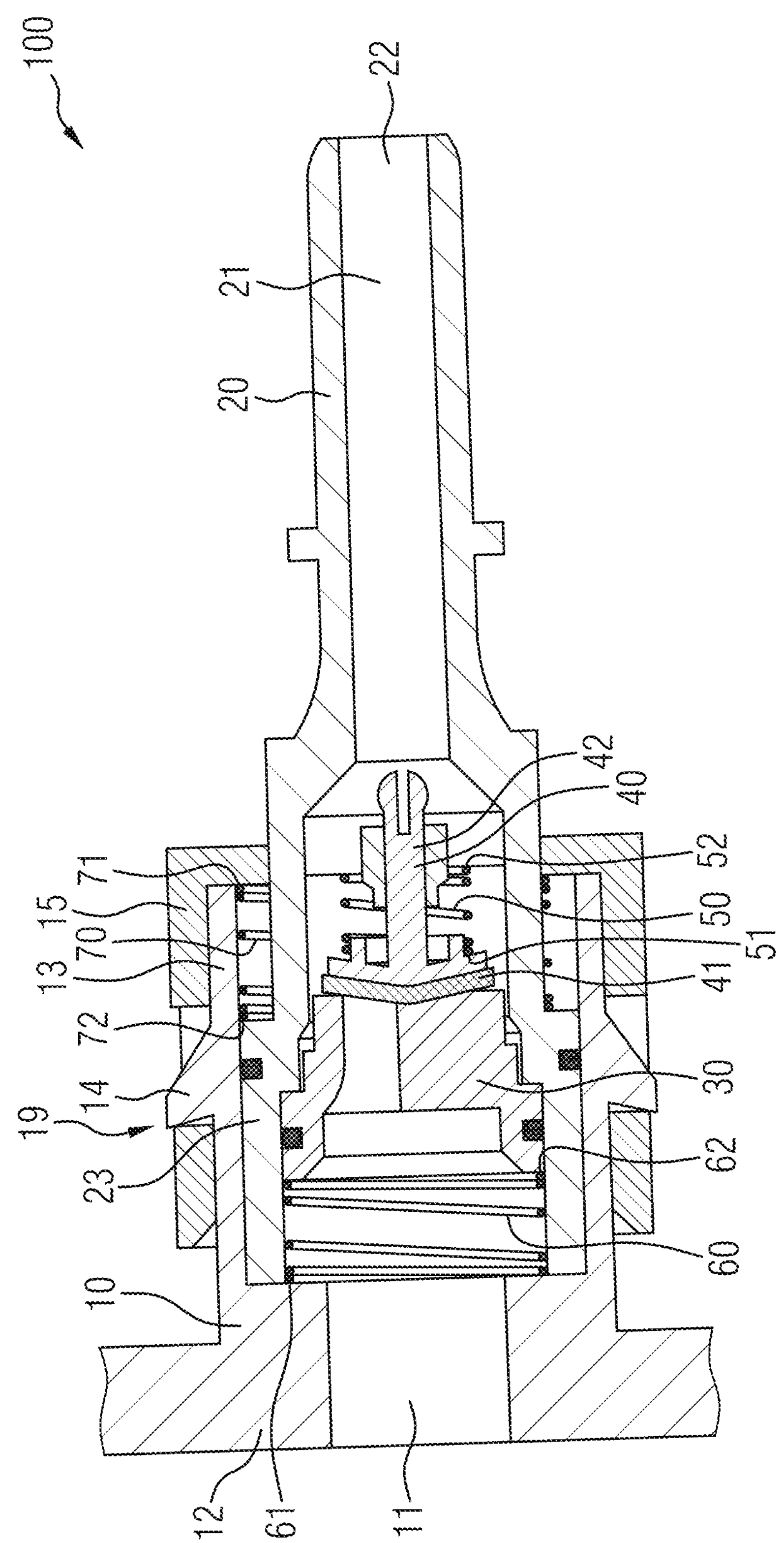
FIG. 1 a cross-sectional view of a check valve according to one embodiment in a closed position, FIG. 2 an exploded illustration of the cross-sectional view of the check valve as shown in FIG. 1, FIG. 3 a cross-sectional view of the check valve shown in FIG. 1, in a state in which a valve body, together with a valve element and a valve member which are received in the valve body, has been moved to the right in comparison with the state shown in FIG. 1, and FIG. 4 a cross-sectional view of the check valve shown in FIG. 1, in a state in which the valve element has been moved to the left in comparison with the state shown in FIG. 1.
Figure 2:
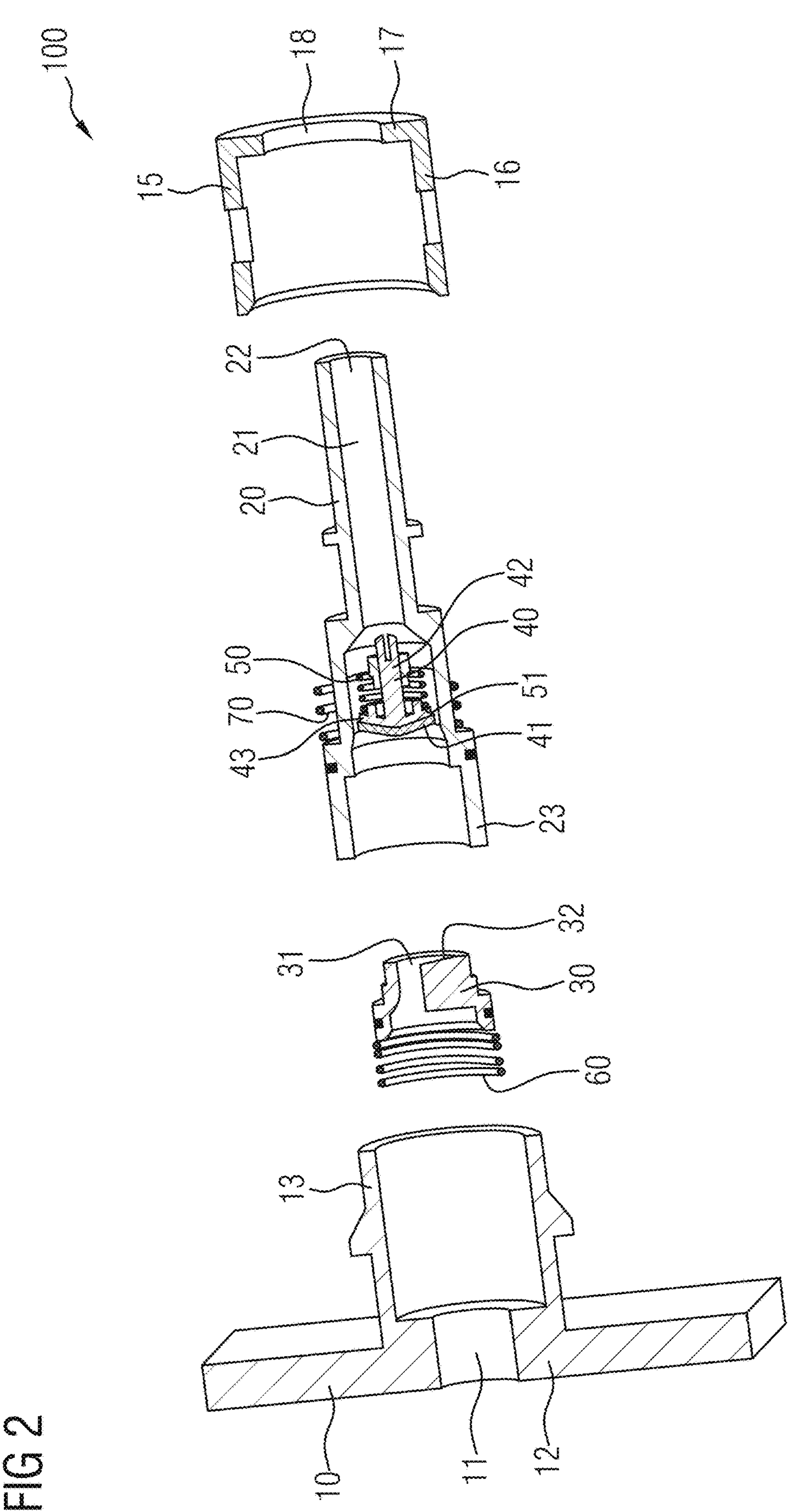

FIG. 1 shows a cross-sectional view of a check valve according to one embodiment in a closed position, and FIG. 2 shows an exploded illustration of the cross-sectional view of the check valve as shown in FIG. 1.

The check valve 100 is used, for example, in a fluid system (not illustrated) of a motor vehicle, for cleaning a sensor by a fluid. The check valve 100 may also be used in a fluid system in which the fluid is or at least contains urea.

The check valve 100 includes a housing having a main body 10, which has an inlet opening 11 provided for being connected to a fluid reservoir (not shown), for example by a feed line. Between the inlet opening 11 and the fluid reservoir, a pump (not shown) is arranged, by which the fluid is pumped, when required, from the fluid reservoir to the inlet opening 11 in order to bring about an inlet pressure of the fluid at the inlet opening 11, the inlet pressure being dependent on, inter alia, the performance of the pump.

The check valve 100 also includes a valve body 20, which has a passage 21 having an outlet opening 22 and which is partly arranged in the main body 10 and is axially movable relative to the main body 10.

The main body 10 includes a pot-like portion having a main body bottom 12, in which the inlet opening 11 is provided, and having a wall portion 13, which radially surrounds at least one further portion of the valve body 20.

The housing also includes a pot-like retaining cap 15 having a wall 16, which radially surrounds a portion of the main body 10 and is fastened thereto, and having a bottom 17 with an opening 18, through which a portion of the valve body 20 extends. The fastening of the retaining cap 15 to the portion of the main body 10 is accomplished, for example, by a snap connection, in the case of which the retaining cap 15 has at least one engagement feature 19, for example in the form of one or more holes, and the main body 10 has a corresponding number of engaging devices 14, for example in the form of radial protrusions, which engage in the corresponding engagement features 19 when the retaining cap 15 is slipped over the main body 10.

A valve element 30 is at least partly arranged in the valve body 20, which valve element is axially moved relative to the valve body 20 and has a through-opening 31.

Between the outlet opening 22 and the valve element 30, a valve member 40 is also arranged in the valve body 20, the valve member having a sealing element 41, which includes or is formed of, for example, a rubber, a valve disk 43, on which the sealing element 41 is arranged, and a valve stem 42, which is axially movable relative to the valve body 20, with guidance by a guide portion of an inner wall of the valve body 20.

The check valve 100 also includes a preloading element 50, which has a first end 51, which is supported on a side of the valve disk 43 of the valve member 40 that faces the outlet opening 22, and a second end 52, which is supported, for example, on a radially inwardly extending portion of the inner wall of the valve body 20, in order to preload the valve member 40 toward the valve element 30 with a preload force.

The check valve 100 also includes a further preloading element 60, which has a first end 61, which is supported on a region of the main body bottom 12 surrounding the inlet opening 11, and a second end 62, which is supported on a region of the valve element 30 surrounding the through-opening 31 of the valve element 30 and facing the main body bottom 12, in order to preload the valve element 30 toward the valve member 40 with a preload force of the further preloading element 60.

In addition to or as an alternative to the further preloading element 60, the check valve 100 includes another preloading element 70, which has a first end 71, which is supported on a region of the bottom 17 of the retaining cap 15 surrounding the opening 18, and a second end 72, which is supported on an axial front face of a radially protruding portion 23 of the valve body 20, in order to preload the valve body 20 toward the inlet opening 11 with a preload force of the other preloading element 70.

The valve element 30 includes a sealing seat 32, which surrounds the through-opening 31 and faces the sealing element 41. In the closed position of the check valve 100 as illustrated in FIG. 1, the sealing element 41 abuts the sealing seat 32 and closes the through-opening 31, when the inlet pressure produced by the pump and thus a force acting on the sealing element 41 toward the outlet opening 22 lies below a specified inlet pressure value determined by the preload force acting in the opposite direction.

In order to prevent the fluid from flowing from the inlet opening 11 to the outlet opening 22 when the check valve 100 is in the closed position, the valve body 20 is radially sealed to the main body 10 and the valve element 30 is radially sealed to the valve body 20, for example by further sealing elements not illustrated in the Figures.

When the inlet pressure produced by the pump lies above the specified inlet pressure value, the corresponding applied force moves the valve member 40, together with the sealing element 41, toward the outlet opening 22 into an open position of the check valve 100, so that the through-opening 31 is opened and the fluid flows from the inlet opening 11 through the through-opening 31 and through the passage 21 to the outlet opening 22.

The valve element 30 is at least partly received in a receiving space of the valve body 20, wherein an inner wall of the receiving space has a radially inwardly extending portion 24, which is designed to limit the axial movement of the valve element 30 toward the outlet opening 22 relative to the valve body 20.

Figure 3:
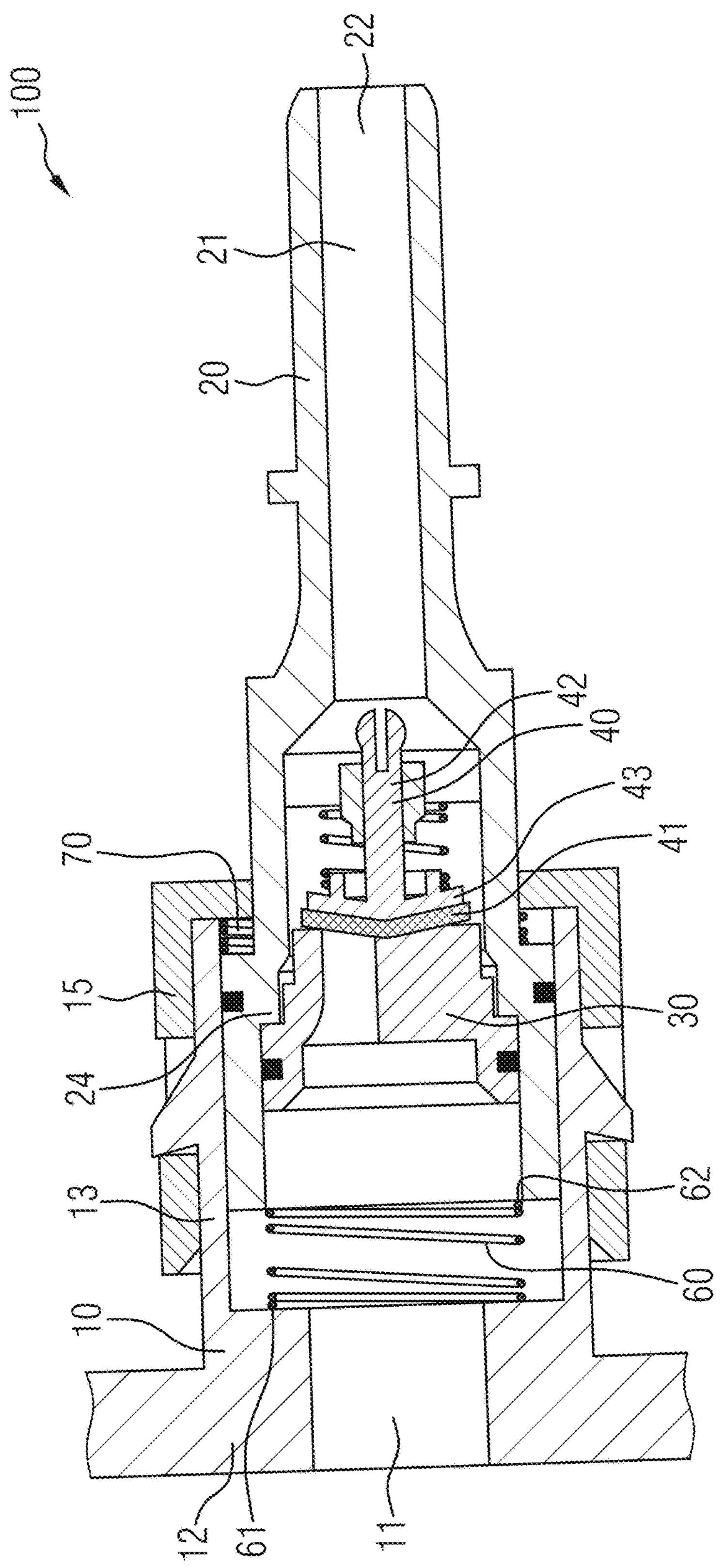

FIG. 3 shows a cross-sectional view of the check valve 100 shown in FIG. 1, in a state in which the valve body 20, together with the valve element 30 and the valve member 40 which are received in the valve body 20, has been moved to the right in comparison with the state shown in FIG. 1.

This movement is caused, for example, by the following: the fluid entering through the inlet opening 11 expands as a result of freezing of the fluid in the fluid reservoir and/or in the corresponding feed line to the check valve 100, and the expanding frozen/freezing fluid presses or moves the valve element 30 to the right in the direction of the outlet opening 22 and, as soon as a portion of the valve element 30 abuts the radially inwardly extending portion 24, also presses or moves the valve body 20 to the right in the direction of the outlet opening 22 against the preload force of the other preloading element 70, which is applied by the other preloading element 70. In the process, as a result of the contact of the sealing seat 32 with the sealing element 41 the latter is likewise moved, together with the valve disk 43 and the valve stem 42, to the right in the direction of the outlet opening 22.

Figure 4:
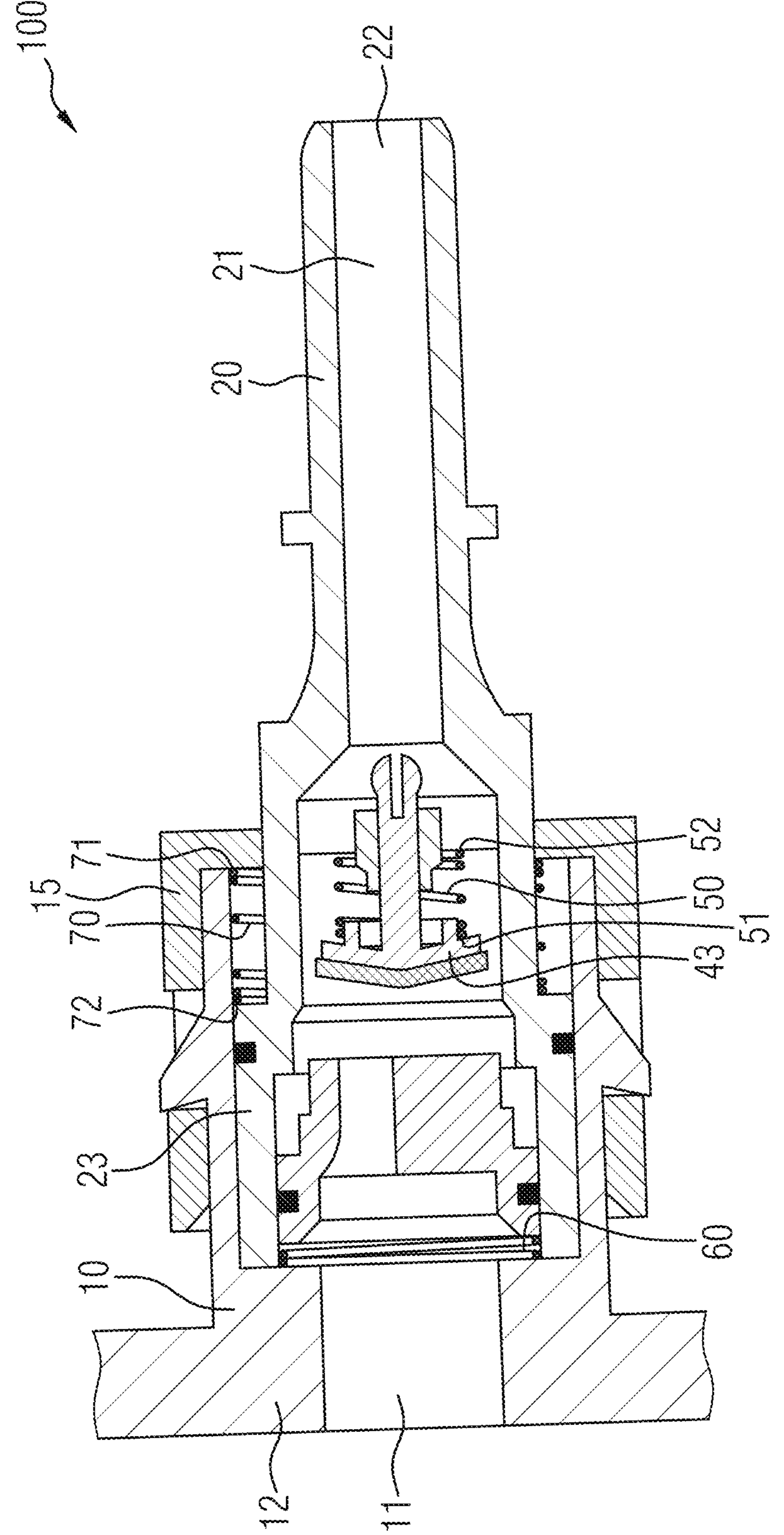

FIG. 4 shows a cross-sectional view of the check valve 100 shown in FIG. 1, in a state in which the valve element 30 has been moved to the left in comparison with the state shown in FIG. 1.

This movement is caused, for example, by the following: a fluid entering through the outlet opening 22 from an outlet line (not shown) of the check valve 100 expands toward the check valve 100 as a result of freezing of the fluid in the outlet line, and the expanding frozen/freezing fluid presses the valve element 30 to the left in the direction of the inlet opening 11 against the further preload force applied by the further preloading element 60.

The description of the invention is merely exemplary in nature and, thus, variations that do not depart from the gist of the invention are intended to be within the scope of the invention. Such variations are not to be regarded as a departure from the spirit and scope of the invention.

LIST OF REFERENCE SIGNS

10 Main body
11 Inlet opening
12 Main body bottom
13 Wall portion
14 Engaging device
15 Retaining cap
16 Wall
17 Bottom
18 Opening
19 Engagement device
20 Valve body
21 Passage
22 Outlet opening
23 Radially outwardly protruding portion
24 Radially inwardly extending portion
30 Valve element
31 Through-opening
32 Sealing seat
40 Valve member
41 Sealing element
42 Valve stem
43 Valve disk
50 Preloading element
51 First end of the preloading element
52 Second end of the preloading element
60 Further preloading element
61 First end of the further preloading element
62 Second end of the further preloading element
70 Other preloading element
71 First end of the other preloading element
72 Second end of the other preloading element
100 Check valve

What is claimed is:

1. A check valve, comprising:
a housing, further comprising:
a main body, further comprising:
a pot-like portion, having a main body bottom, in which the inlet opening is provided; and
a wall portion;
an inlet opening being part of the main body;
a valve body at least partly arranged in the main body and is axially movable relative to the main body, a further portion of the valve body surrounded by the wall portion, the valve body further comprising:
a passage;
an outlet opening being part of the passage;
a valve element at least partly arranged in the valve body for axial movement relative to the valve body, the valve element further comprising:
a through-opening;
a sealing seat which surrounds the through-opening;
a valve member, which is arranged in the valve body between the outlet opening and the valve element, the valve member further comprising:
a sealing element, the sealing seat facing the sealing element; and
a valve stem, which is axially movable relative to the valve body;

a preloading element, which is designed to preload the valve member toward the valve element with a preload force;

a further preloading element, which is designed to preload the valve element toward the valve member with a further preload force; and/or another preloading element, which is designed to preload the valve body toward the inlet opening with another preload force;

wherein in a closed position of the check valve, the sealing element abuts the sealing seat and closes the through-opening.

2. The check valve of claim 1, in which the valve body is radially sealed to the main body and/or the valve element is radially sealed to the valve body.

3. The check valve of claim 1, the housing further comprising a retaining cap, which has a bottom with an opening.

4. The check valve of claim 3, the another preloading element further comprising: a first end, which is supported on a region of the bottom of the retaining cap surrounding the opening; and a second end, which is supported on an axial front face of the valve body; and/or wherein the retaining cap has a wall, which radially surrounds a portion of the main body and/or is fastened thereto; and/or in which a portion of the valve body extends through the opening.

5. The check valve of claim 1, the further preloading element further comprising:

a first end, which is supported on a region of the main body bottom surrounding the inlet opening; and a second end, which is supported on a region of the valve element surrounding the through-opening of the valve element and facing the main body bottom.

6. A check valve comprising:

a housing, further comprising:

a main body;

an inlet opening being part of the main body;

a valve body at least partly arranged in the main body and is axially movable relative to the main body, the valve body further comprising:

a passage;

an outlet opening being part of the passage;

a valve element at least partly arranged in the valve body for axial movement relative to the valve body, the valve element further comprising:

a through-opening;

a sealing seat which surrounds the through-opening a valve member, which is arranged in the valve body between the outlet opening and the valve element, the valve member further comprising:

a sealing element, the sealing seat facing the sealing element; and a valve stem, which is axially movable relative to the valve body;

a preloading element, which is designed to preload the valve member toward the valve element with a preload force, the preloading element further comprising:

a first end, which is supported on a valve disk of the valve member; and a second end, which is supported on a radially inwardly extending portion of an inner wall of the valve body;

a further preloading element, which is designed to preload the valve element toward the valve member with a further preload force; and/or another preloading element, which is designed to preload the valve body toward the inlet opening with another preload force;

wherein in a closed position of the check valve, the sealing element abuts the sealing seat and closes the through-opening.

7. The check valve of claim 1, wherein during use, with the check valve in an open position, a fluid flows sequentially through the inlet opening, the through-opening, the passage and the outlet opening.

8. A fluid system supported by a motor vehicle, the fluid system comprising:

a check valve, further comprising:

a housing, further comprising:

a main body;

an inlet opening being part of the main body;

a valve body at least partly arranged in the main body and is axially movable relative to the main body, the valve body further comprising:

a passage;

an outlet opening being part of the passage;

a valve element at least partly received in a receiving space in the valve body for axial movement relative to the valve body, the valve element further comprising:

a through-opening;

a sealing seat which surrounds the through-opening;

an inner wall being part of the receiving space, the inner wall having a radially inwardly extending portion, which is designed to limit the axial movement of the valve element toward the outlet opening relative to the valve body;

a valve member, which is arranged in the valve body between the outlet opening and the valve element, the valve member further comprising:

a sealing element, the sealing seat facing the sealing element; and a valve stem, which is axially movable relative to the valve body;

a preloading element, which is designed to preload the valve member toward the valve element with a preload force;

a further preloading element, which is designed to preload the valve element toward the valve member with a further preload force; and/or another preloading element, which is designed to preload the valve body toward the inlet opening with another preload force;

wherein in a closed position of the check valve, the sealing element abuts the sealing seat and closes the through-opening.

9. The fluid system of claim 8, wherein the check valve cleans a sensor by use of a fluid.

* * * * *